No. 782,609.	Patented February 14, 1905.

UNITED STATES PATENT OFFICE.

GEORGE FRANÇOIS JAUBERT, OF PARIS, FRANCE.

PROCESS OF OBTAINING OXYGEN.

SPECIFICATION forming part of Letters Patent No. 782,609, dated February 14, 1905.

Application filed January 29, 1904. Serial No. 191,126.

*To all whom it may concern:*

Be it known that I, GEORGE FRANÇOIS JAUBERT, residing at Paris, France, have invented a new and useful Improvement in the Preparation of Oxygen, which improvement is fully set forth in the following specification.

In my applications for Letters Patent Serial Nos. 169,077, 184,105, and 184,106 I have described a process for preparing a powder containing chlorid of lime, sulfates of copper, and iron, the said powder by the action of water spontaneously evolving oxygen. From the point of view of properly preserving the product it is preferable to mix the sulfate of iron (or of manganese) only at the moment of use, because the sulfate of iron becomes transformed after a time into the little active ferric sulfate. It is expedient, therefore, to proceed as follows: One hundred kilos of dry chlorid of lime are pulverized with five kilos of sulfate of copper, of nickel, of cobalt, or other suitable salt. A white powder is thus obtained which keeps very well and which generates oxygen when merely placed into a fifteen-per-cent. solution of sulfate of iron or of manganese.

Although in the claims I have specifically referred to the use of the salts of copper, it is to be understood that I consider the salts of cobalt and the salts of nickel as equivalents for the salts of copper, and therefore within the scope of my invention.

Having now particularly described and ascertained the nature of my said invention and in what manner the same is to be performed, I declare that what I claim is—

1. The process of preparing oxygen, which consists in adding a solution of the salt of a metal of the iron group to a mixture containing chlorid of lime and a salt of copper.

2. The process of preparing oxygen, which consists in adding a solution of the salt of a metal of the iron group to a powdered mixture containing chlorid of lime and a salt of copper.

3. The process of preparing oxygen, which consists in adding a solution of a salt of iron to a mixture containing chlorid of lime and a salt of copper.

4. The process of preparing oxygen, which consists in adding a solution of sulfate of iron to a mixture containing chlorid of lime and a salt of copper.

5. The process of preparing oxygen, which consists in adding a solution of sulfate of iron to a mixture containing chlorid of lime and sulfate of copper.

6. The process of preparing oxygen, which consists in adding a fifteen-per-cent. solution of sulfate of iron to a mixture containing one hundred parts chlorid of lime and five parts sulfate of copper.

In testimony whereof I have signed this specification in the presence of two subcribing witnesses.

GEORGE FRANÇOIS JAUBERT.

Witnesses:
 JEAN PIERRE ETIENNE VAUCHER,
 HANSON O. COXE.